US009944500B2

(12) United States Patent
Burkey et al.

(10) Patent No.: US 9,944,500 B2
(45) Date of Patent: Apr. 17, 2018

(54) MATERIAL LIFTING SYSTEM AND METHOD

(71) Applicant: Columbus McKinnon Corporation, Amherst, NY (US)

(72) Inventors: John R. Burkey, Salem, OH (US); Robert T. Bultema, Whitehall, MI (US); Mark R. Paradowski, Lancaster, NY (US); Stacie Wingfield, Amherst, NY (US); Shaun Johnston, Burt, NY (US); Brett R. McCleary, Ravenna, MI (US)

(73) Assignee: Columbus McKinnon Corporation, Getzville, NY (US)

( * ) Notice: Subject to any disclaimer, the term of this patent is extended or adjusted under 35 U.S.C. 154(b) by 0 days.

(21) Appl. No.: 14/377,544

(22) PCT Filed: Feb. 13, 2013

(86) PCT No.: PCT/US2013/025862
§ 371 (c)(1),
(2) Date: Aug. 8, 2014

(87) PCT Pub. No.: WO2013/122997
PCT Pub. Date: Aug. 22, 2013

(65) Prior Publication Data

US 2016/0016764 A1 Jan. 21, 2016

Related U.S. Application Data

(60) Provisional application No. 61/600,470, filed on Feb. 17, 2012.

(51) Int. Cl.
*G06F 7/00* (2006.01)
*B66C 15/06* (2006.01)
(Continued)

(52) U.S. Cl.
CPC .............. *B66C 15/065* (2013.01); *B66C 1/66* (2013.01); *B66C 13/16* (2013.01); *B66C 13/48* (2013.01)

(58) Field of Classification Search
None
See application file for complete search history.

(56) References Cited

U.S. PATENT DOCUMENTS 4,216,868 A * 8/1980 Geppert ................ B66C 23/905 212/278
8,565,913 B2 * 10/2013 Emanuel ............... B66F 9/0755 340/572.1

(Continued)

FOREIGN PATENT DOCUMENTS

EP 1864939 A1 12/2007
JP 2008120536 A * 5/2008

(Continued)

*Primary Examiner* — Prasad V Gokhale
(74) *Attorney, Agent, or Firm* — Phillips Lytle LLP; David L. Principe

(57) ABSTRACT

An improved material handling system (15, 115) comprising a material lifting device (16), the material lifting device having a sensor (23) for sensing an operational parameter associated with the material lifting device, a load attachment device (18) configured and arranged to attach a load to the material lifting device, the load attachment device having a data tag (20) containing data regarding one or more parameters associated with the load attachment device, a reader (21) configured and arranged to read the data tag, a processing unit (22) communicating with the reader and the sensor, the processing unit configured and arranged to receive data from the reader and the sensor, and a material handling control device (19) configured and arranged to control operation of the material handling device.

34 Claims, 3 Drawing Sheets

(51) Int. Cl.
*B66C 13/48* (2006.01)
*B66C 1/66* (2006.01)
*B66C 13/16* (2006.01)

(56) References Cited

U.S. PATENT DOCUMENTS

| | | | | |
|---|---|---|---|---|
| 2005/0231148 | A1* | 10/2005 | Pook | A63J 1/028 318/612 |
| 2008/0252417 | A1* | 10/2008 | Thomas | B66C 13/46 340/10.1 |
| 2009/0055039 | A1* | 2/2009 | Pollock | B66C 1/08 701/34.4 |
| 2009/0259373 | A1* | 10/2009 | Nichols | E02F 9/264 701/50 |
| 2010/0097181 | A1* | 4/2010 | Sorensen | A61G 7/10 340/10.1 |
| 2010/0117787 | A1* | 5/2010 | Postelwait | B66C 1/12 340/5.1 |
| 2011/0276261 | A1* | 11/2011 | Mizutani | B66C 13/18 701/123 |
| 2012/0101653 | A1* | 4/2012 | Tran | G01D 4/004 700/296 |
| 2012/0165962 | A1* | 6/2012 | Faivre | G05B 19/106 700/19 |
| 2015/0076100 | A1* | 3/2015 | Ellicott | B66C 15/065 212/278 |
| 2015/0199893 | A1* | 7/2015 | St. Germain | B66C 15/00 340/539.1 |
| 2016/0031682 | A1* | 2/2016 | Sorensen | B66C 13/06 212/273 |

FOREIGN PATENT DOCUMENTS

| | | | |
|---|---|---|---|
| JP | 2008120536 A | * | 5/2008 |
| JP | 2008308238 A | | 12/2008 |

* cited by examiner

MATERIAL LIFTING SYSTEM AND METHOD

TECHNICAL FIELD

The present invention relates generally to the field of material handling systems, and more particularly to an improved material lifting monitoring and management system and a method of using such a system.

BACKGROUND ART

U.S. Pat. No. 7,121,457, entitled "Automatically Adjusting Parameters of a Lifting Device by Identifying Objects to be Lifted," is directed to a system having RFID tags, on which is stored a value associated with an adjustable parameter, attached to materials being lifted by a lifting device and an interrogator module linked to the lifting device that communicates with the RFID tag to obtain the value and adjust the parameter as a function of the data from the RFID tag.

U.S. Pat. No. 7,825,770, entitled "System and Method of Identification, Inspection and Training for material Lifting Products," is directed to a method that includes the steps of attaching an RFID tag to a material lifting device, the RFID tag having identification and inspection data, wherein the identification and inspection data is accessed during periodic inspections with a portable computer device having a RFID reader and the inspection data is updated on the portable computer device and also on the RFID tag during such inspections.

U.S. Pat. No. 7,612,673, entitled "RFID System for Lifting Devices," is directed to a lifting device equipped with an RFID scanning system having an article receiving area configured for receipt of a stack of articles having associated RFID tags.

U.S. Patent Publication No. 2006/0043197, entitled "Carrier Facilitating Radio-Frequency Identification (RFID) Operation in a Semiconductor Fabrication System," is directed to a radio-frequency identification system for a semiconductor manufacturing environment. The system comprises a carrier having a carrier body and a RFID tag mounted on the carrier body, where the carrier body comprises a plate inscribed with permanent information corresponding to the carrier with the permanent information stored in the RFID tag.

BRIEF SUMMARY OF THE INVENTION

With parenthetical reference to the corresponding parts, portions or surfaces of the disclosed embodiment, merely for the purposes of illustration and not by way of limitation, the present invention provides an improved material handling system (15, 115) comprising a material lifting device (16), the material lifting device having a sensor (23) for sensing an operational parameter associated with the material lifting device, a load attachment device (18) configured and arranged to attach a load to the material lifting device, the load attachment device having a data tag (20) containing data regarding one or more parameters associated with the load attachment device, a reader (21) configured and arranged to read the data tag, a processing unit (22) communicating with the reader and the sensor, the processing unit configured and arranged to receive data from the reader and the sensor, and a material handling control device (19) configured and arranged to control operation of the material handling device.

The material lifting device may comprise a hoist. The operational parameter associated with the material lifting device may be selected from a group consisting of malfunction, load weight, overload, excessive jogging, starts beyond duty cycle, run time beyond duty cycle, and excessive heat. The load attachment device may comprise a below-the-hook lifting device. The load attachment device may be selected from a group consisting of a shackle, a vacuum lifting device, a magnet, a rigging hook, a sling, an eyebolt, a turnbuckle, a ring, a block, a chain, a clamp and a clip. The data tag may comprise an RFID tag. The RFID tag may comprise an active RFID tag. The data tag may comprise a writable RFID tag. The processing unit may be configured and arranged to write to the RFID tag. The parameter associated with the load attachment device may be selected from a group consisting of rated capacity, load attachment device weight, identification number, inspection status, and size. The reader may comprise an RFID tag reader. The processing unit may comprise a microprocessor. The material handling control device may comprise an operator control pendant. The microprocessor may be programmed to provide an output as a function of the received data and to communicate the output to the operator control pendant. The operator control pendant may communicate wirelessly with the processing unit. The operational parameter associated with the material lifting device may comprise load weight, the parameter associated with the load attachment device may comprise rated weight capacity, and the microprocessor may be programmed to compare the load weight and the rated weight capacity. The microprocessor output may comprise a warning signal if the load weight exceeds the rated weight capacity. The reader may be on the material handling lifting device. The reader may be on the material handling control device.

The system may further comprise a data processing platform (25) configured and arranged to collect data via a wireless network from the processing unit. The wireless network may comprise a WiFi network (24/30). The wireless network may comprise a cellular network (136). The system may further comprise a data processing center (37) configured and arranged to collect data via the internet from the data processing platform. The data processing center may be configured to communicate with a remote user interface (38, 39). The user interface may comprise a customer computer or a distributor computer and the communication may be via the internet. The user interface may comprise a display screen and a keyboard. The processing unit may be connected to a wireless interface (24). The system may further comprise a data processing platform (25) having a wireless interface (30) configured to receive data transmitted from the processing unit. The data processing platform may comprise a data storage device (32) configured to store data received from the processing center. The data processing platform may comprise a computer. The data processing platform may be connected (40) to the internet.

The system may further comprise a data processing center connected to the internet and configured and arranged to process data received from the data processing platform. The data processing center may be configured and arranged to provide a report of the processed data received from the data processing platform. The report may provide information on operating mode, predictive maintenance, operator training or safety with respect to the material lifting device. The report may be provided via a website.

In another aspect, a material handling system is provided comprising a hoist, a reader connected to the hoist and configured and arranged to read a data tag, and a processing unit communicating with the reader and configured and arranged to receive data from the reader.

In another aspect, a method of monitoring a material handling system is provided comprising the steps of providing a material handling system comprising a material lifting device, the material lifting device having a sensor for sensing an operational parameter associated with the material lifting device, a load attachment device configured and arranged to attach a load to the material lifting device, the load attachment device having a data tag containing data regarding one or more parameters associated with the load attachment device, a reader configured and arranged to read the data tag, a processing unit communicating with the reader and the sensor, the processing unit configured and arranged to receive data from the reader and the sensor, and a material handling control device configured and arranged to control operation of the material handling device, read the data tag of the load attachment device, and transmit the data to a processing platform.

The processing unit may be programmed to provide an output as a function of the received data and to communicate the output to the operator control pendant. The operational parameter associated with the material lifting device may comprise load weight, the parameter associated with the load attachment device may comprise rated weight capacity, and the processing unit may be programmed to compare the load weight and the rated weight capacity. The output may be a warning signal if the load weight exceeds the rated weight capacity.

The processing platform may be programmed to provide an output as a function of the received data and to communicate the output to the operator control pendant. The operational parameter associated with the material lifting device may comprise load weight, the parameter associated with the load attachment device may comprise rated weight capacity, and the processing unit may be programmed to compare the load weight and the rated weight capacity. The output may be a warning signal if the load weight exceeds the rated weight capacity.

The processing platform may be programmed to provide an output as a function of the received data and to communicate the output to a user interface. The output may be communicated to the user interface via the internet. The output may be communicated to the user interface via a cellular network. The data may be transmitted via a wireless network from the processing unit to the processing platform. The wireless network may comprise a WiFi network. The wireless network may comprise a cellular network. The method may further comprise the step of storing the data on a data storage device. The method may further comprise the step of transmitting the data from the data processing platform to a data processing center via the internet. The method may further comprise the step of generating a report from the data. The report may provide information on operating mode, predictive maintenance, operator training or safety with respect to the material lifting device. The method may further comprise the step of providing the report on a website accessible via the internet.

Accordingly, an object of the present invention is to provide an improved material handling system which is adapted to be used to monitor material handling operations.

Another object is to provide an improved material handling system which is adapted to be used to managing material handling operations.

Another object is to provide an improved material handling system which is adapted to be used to report material handling operations data to users.

Another object is to provide an improved material handling system which is adapted to be used to collect, analyze and display data regarding material handling operations.

DESCRIPTION OF THE PREFERRED EMBODIMENTS

Figure 1:
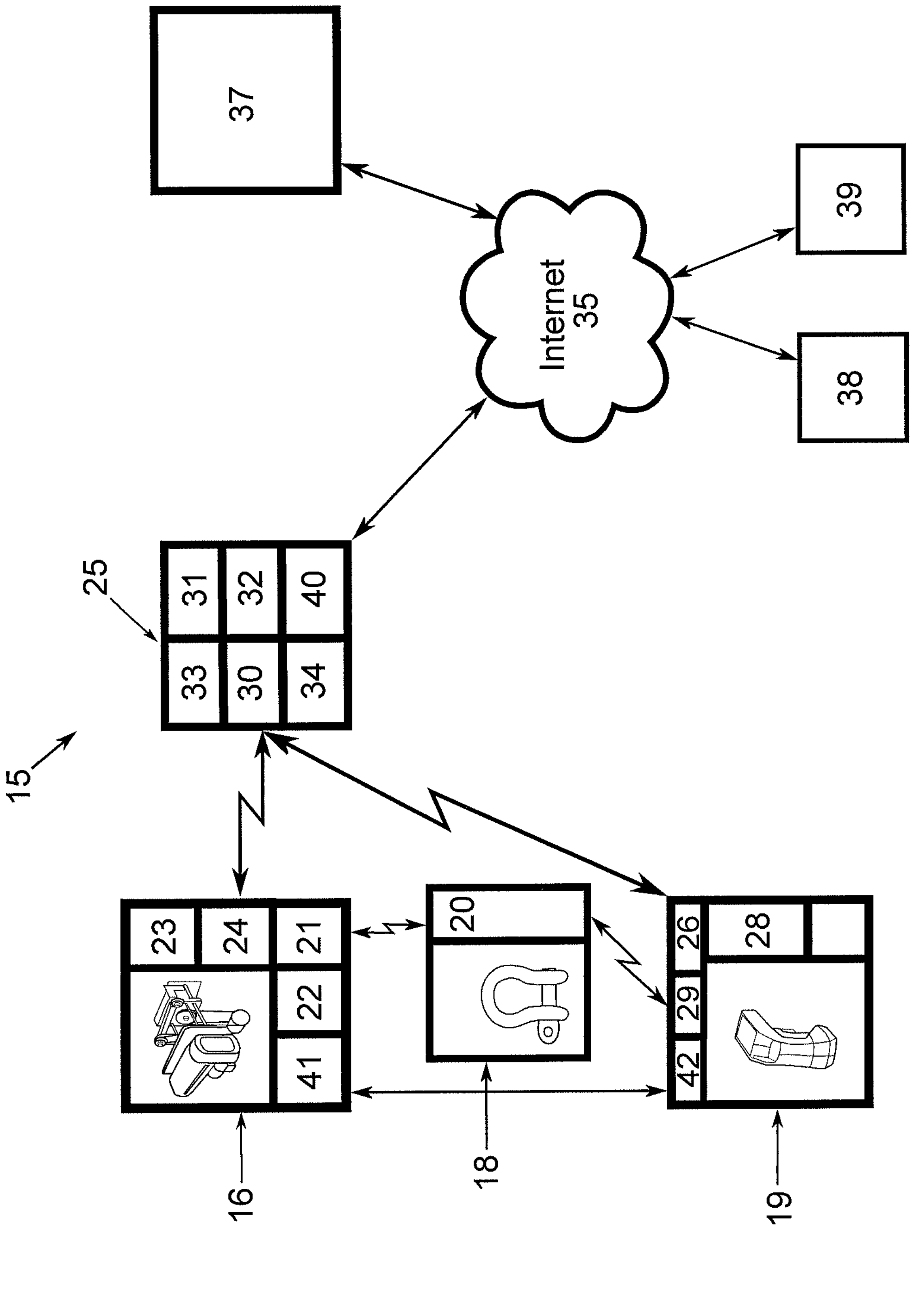
FIG. 1 is a schematic of a first embodiment of the improved material handling system.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to the drawings, and more particularly to FIG. 1 thereof, this invention provides an improved material handling system, of which a first embodiment is generally indicated at 15. System 15 is shown as broadly including hoist 16, load attachment device 18, operator control pendant 19, local computer 25, and server 37.

As shown in FIG. 1, load attachment hardware/device 18, such as a below-the-hook (BTH) lifting device, is provided for attachment of a load to hoist 16. In this embodiment, load attachment device 18 is a shackle. While shackle 18 is shown and described, other load attachment devices may be used. For example, the load attachment device may comprise a vacuum lifting device, a magnet, a rigging hook, a sling, an eyebolt, a turnbuckle, a ring, a clip, a block, a chain, a clamp or a clip.

Shackle 18 includes radio frequency identification (RFID) chip or tag 20. RFID tag 20 may be attached to shackle 18 adhesively and/or may be recessed in a hole on the end of the shackle bolt. As another alternative, RFID tag 20 may be formed in a portion of shackle 18 during manufacturing. Thus, shackle 18 may be retrofit with RFID tag 20 or manufactured at the factory with RFID tag 20.

RFID tags of any known type may be used, including active RFID tags, passive RFID tags, semi-passive RFID tags, read only RFID tags, and read/write RFID tags. Active RFID tags are battery-powered devices that transmit a signal to a reader and typically have long ranges such as 100 feet or more. Passive RFID tags are not battery powered but rather draw energy from electromagnetic waves provided from an RFID reader. Passive RFID tags often have a range of about 10 feet or less. Semi-passive RFID tags employ a battery to run the circuitry of a chip but rely on an electromagnetic wave from a reader to power the transmitted signal. Read-only RFID tags have a serial number that is used in connection with a corresponding database. With a read/write RFID tag, data can be written into the tag by the user. The RFID tag includes an antenna for receiving and transmitting the signal, with the type of antenna generally a function of the operating frequency and desired range of the system.

In this embodiment, hoist 16 is a wire rope hoist with a five ton capacity. Hoist 16 includes a deep grooved heavy duty rope drum, a heavy duty DC disk brake, motors designed for hoisting service, triple reduction hoist gearing and an oil tight gear case, a heavy duty steel frame, a trolley that is easily adjustable to handle a wide range of beam flange widths, an upper and lower geared limit switch, and a two-speed hoist and trolley control. The hoist motor is two-speed with a 4:1 ratio from high to low speed. The wire rope drum is deep grooved with a rope guide and is machined from steel. The wire rope is secured to the drum with three heavy deck tile iron clamps and is designed to have three extra wraps of wire rope on the drum with the rope at full extension. The hoist is provided with a bearing mounted trunnion hook that rotates 360-degrees and swings back and forth 180-degrees for easier load adjustment. The Yale Global King Monorail Wire Rope Hoist, manufactured by Yale of Wadesboro, N.C., may be used in this embodiment. Other types of electrically power hoist may be used as alternatives, including without limitation other sized and types of wire rope hoists or chain hoists.

Pendant 19 is connected to hoist 16 so that a user can remotely control operation of hoist 16. Pendant 19 generally includes a number of control buttons, including a button for immediately stopping the hoist and a speed control button. In this embodiment, pendant 19 also includes at least one colored warning indicator. Alternatively, pendant 19 may include a digital display for providing information and warnings to the user and/or an audio warning system.

Hoist 16 includes RFID reader or interrogator 21. Reader 21 is a two-way radio transmitter/receiver that sends a signal to RFID tag 20 and reads RFID tag 20's response. Reader 21 includes an RFID writer, which can write data to the data tag. Data written to the tag may include parameter data, including an indicator that the hook device has been operated beyond its capability and should be examined before further use. Other parameters that may be written to the data tag include a variable which is a function of the operation time of the below the hook device since the its last maintenance, the record of any emergency or warning conditions during operation, a record of which user IDs were operating the system, maintenance related data, and other similar information.

In this embodiment, pendant 19 also includes RFID reader 29. Thus, pendant 19 may be used to read and write to RFID tag 20 on shackle 18 and to communicate such data wirelessly with both hoist 16, via interface 42, and local computer 25, via interface 26.

While an RFID reader and an RFID tag are described, various alternative reader-tag technologies may be used for the reader-tag interface, including a single wire interface, a multiwire interface, or other wireless interfaces. By way of example, a single wire interface such as the Dallas Semiconductor 1-wire microlan found in automobile transponder keys may be used. Viable multi-wire interfaces for reading electronic codes include the $I^2C$ interface, the SPI bus interface, or the CAN bus interface. Other wireless interfaces include Bluetooth, or an optical reader-coded tag interface such as a bar code reader or QR code reader.

Hoist 16 also includes PC interface 24 for communication with computer 25, which in this embodiment is located near or on the same premises as hoist 16. In this embodiment, interface 24 is an IEEE 802.11x WiFi data communication transceiver device. Data is transmitted wirelessly, preferably in a real-time and continuous manner, to and from PC 25. Transceiver 24 may alternatively be a Bluetooth wireless device, which affords good data transmission rates and the ability to ensure such data transmissions are properly encrypted and secure. Transceiver 24 may also be an Ethernet connection transceiver. Alternatively, a point to point protocol (PPP) connection or other similar connection may also be used for the interface with PC 25.

Hoist 16 includes pendant communication interface 41. In this embodiment, interface 41 is an IEEE 802.11x WiFi data communication device. Data is transmitted wirelessly, preferably in a real-time and continuous manner, between pendant 19 and hoist 16. Alternatively, pendant communication interface 41 may be a 1-wire microlan interface, an $I^2C$ two wire interface, a CAN bus, a USB interface, a Bluetooth connection, an infrared line of sight remote control interface, or any other similar wired or wireless interface. Interface 41 may be further configured to receive user data from pendant 19, such as a user ID, a user finger print, a user voice identification phrase, a user iris scan, or other similar user data.

As shown in FIG. 1, hoist 16 includes smart card 22. Card 22 implements and handles the interface with RFID tag 20, the interface with local PC 25, and the interface with pendant 19. Card 22 also controls monitoring and operation of hoist 16. Thus, smart card controller 22 handles data flow between each of the interfaces as well as sensors or other controls within hoist 16. In this embodiment, smart card controller 22 is a microcontroller having its own internal flash memory. Alternative controllers may be used, such as a CPU, a system on a chip, or a programmable logic device such as an FPGA (field programmable gate array) or a PLD (programmable logic device). A memory device may be included with the controller, such as flash memory, a hard disk drive, or other solid state memory device. In this embodiment, software is provided in the microcontroller's flash memory. The software implements communication protocols for each of the interfaces as well as the processing logic for operation of smart card 22. Smart card 22 may be configured to also allow control of the lifting device through local computer network interface 24.

Sensors 23 are configured to provide operating data and other parameters with respect to hoist 16. Such parameters may include drum speed, phase-loss detection and protection, motion monitoring, motor thermal overload sensing, hoist over-capacity sensing, malfunction, load weight, excessive jogging, starts beyond duty cycle, and run time beyond duty cycle. Other sensors, systems or controllers may be used to monitor operation of hoist 16. Thus, microprocessor 22 controls and combines operational data from sensors 23 and reader 21, as well as ensures a continuous second-by-second stream of information through transmitter 24 to local PC 25.

As shown in FIG. 1, local computer 25 generally includes interface 30 for communicating wirelessly with hoist 16 and pendant 19, processor 31 and data storage 32. PC 25 also includes a user interface, namely a display 33 and keyboard 34, for displaying and manipulating data and any reports of the data. As mentioned above, in this embodiment transceiver 30 is an IEEE 802.11x wireless transceiver. In this embodiment, data storage 32 is a hard drive. However, other similar non-volatile memory storage devices may be used.

PC 25 continually monitors data received and stores this data locally in data storage 32. This data is then relayed via internet interface 40 and internet 35 to remote server or CPU 37.

Processor 31 executes software to receive incoming data from smart card 22. The data may be tagged with user input information, such as hoist identification data and BTH device identification data, for future reference. At one second intervals, PC 25 creates and stores a single data record. Each data record comprises one second of captured data from each sensor as well as related "housekeeping" information for keeping track of such data. Upon processing, the data record is then stored in data storage 32.

In this embodiment, server 37 is programmed to communicate with PC 25 to receive and analyze data stored on PC 25. Server 37 then provides information about the operation of hoist 16 to end user computers 38, 39 and/or back to local PC 25. Such information may be provided in the form of periodic reports or, in the case of a malfunction or safety issue for example, in the form of an immediate warning or other signal. End user 38 may be the owner of hoist 16 and end user 39 may be the distributor of hoist 16. Thus, for example, a malfunction would be automatically reported via the internet to owner 38 and distributor 39.

In the event of lost or otherwise dropped data, linear interpolation can optionally be performed to fill in the missing data provided such missing data does not exceed a predetermined number of consecutive missed samples, such as, for example, 3 samples. In the event that more than 3 samples are missed consecutively, an error condition may be indicated and user intervention may be required to investigate the cause of the error.

Alternatively to programming processor 25 to manipulate received data, raw data may be relayed from PC 25 to remote CPU 37, which may include a processor for manipulating and processing the transmitted data. Server 37 may also include a user interface, such as a display and/or keyboard.

System 15 provides a number of improved functionalities. For example, in normal operation mode smart card 22 in the control panel of hoist 16 identifies the BTH device being used with hoist 16 from RFID chip 20 on device 18. Such identification may include serial number, type of device, inspection status, and safe working load (SWL). Card 22 is programmed to determine if device 18 is compatible with hoist 16. If not, card 22 sends a warning signal to the hoist operator via pendant 19. For example, such a warning would be provided if a 2-ton BTH device is identified from RFID chip 20 for use on a 5-ton hoist. Smartcard 22 then monitors hoist operation, records data, and communicates such data to local PC 25 via WiFi and to the operator via pendant 19.

Local PC 25 collects the data and sends packets of data to server 37 via internet 35 at specified time intervals. Server 37 analyzes and mines the data to produce operational information on hoist 16, such as operating mode, predicted maintenance, operator training needs and safety. Server 37 then sends reports to end user contact 38 and distributor contact 39 via internet 35. Server 37 also populates a website with this data, and the websites is accessible to authorized users via internet 35.

In emergency mode, such as a situation in which hoist 16 or lifting hardware 18 malfunctions, is overloaded or misapplied, starts beyond a duty cycle rating, is run beyond a duty cycle rating, experiences excessive heat build-up, or has other sensed problems, smartcard 22 sends a warning signal to the operator via pendant 19. Smartcard 22 also sends a warning signal to server 37 through local PC 25 and internet 35. Server 37 then immediately sends a warning to specified user contacts and specified distributor contacts, such as for example customer 38 and distributor 39. Although in this embodiment such warnings would be sent to a computer, other user interfaces could receive the warning, such as a smart phone, tablet or other handheld device.

Figure 2:
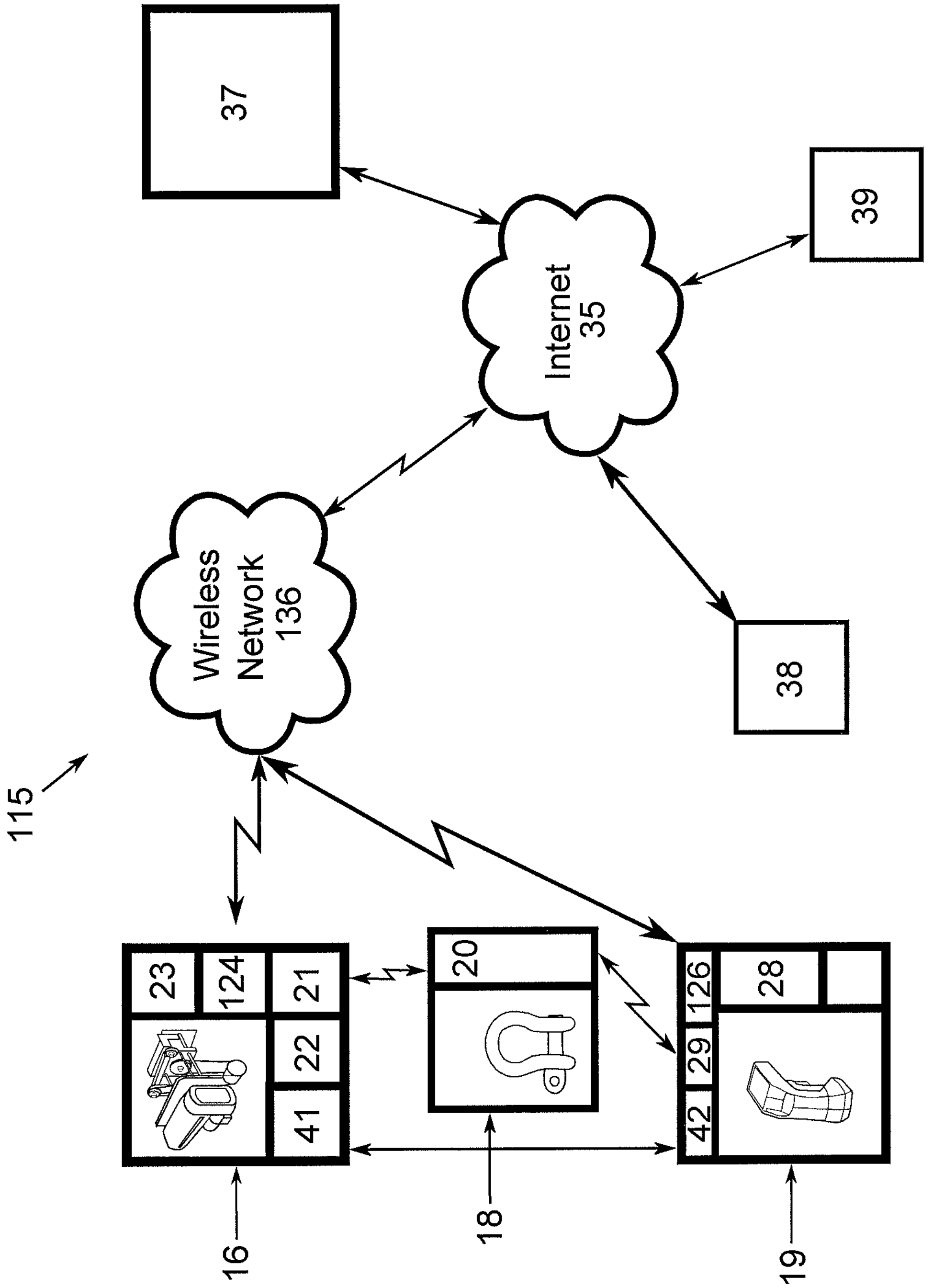
FIG. 2 is a schematic of a second embodiment of the improved material handling system.

A second embodiment 115 of the hoist system is shown in FIG. 2. System 115 is similar to system 15. However, rather than communicating wirelessly with local PC 25, hoist 16 comprises a cellular wireless interface 124. Similarly, rather than communicating wirelessly with local PC 25, pendant 19 may comprise a cellular wireless interface 126. Thus, signals are sent to internet 35 via wireless cellular network 136. Such data is then received by server 37 via wireless cellular network 136 and internet 35. Server 37 processes the received data without any intermediate processing by local PC 25. Warnings, reports and other information is then communicated from server 37 to end users 38 and 39 and/or back to hoist 16 and, if desired, to the operator via pendant 19.

Thus, in system 115 data is relayed by cellular wireless transceiver 124 to remote CPU 37 using a cellular network. Ideally, cellular service is continuously available and data is relayed to central server 37 on a continuous, real-time basis. If cellular service is substandard, and connections thereto are only intermittent, smart card 22 stores the data in memory and awaits a standard cellular connection and then transmits all data not yet transmitted since the last successful transmission up to and including the present data being collected and continues transmitting data as it is collected until the cellular network is no longer available. In this embodiment, hoist 16 may be provided with a large permanent, non-volatile memory capacity so that data is not totally lost. Data may be captured at any suitable rate, such as once per second, with much higher or lower sampling rates possible as limited by the maximum supported data rate of the sampling hardware.

For operation where there is no cellular service, data can alternatively be transmitted using IEEE 802.11x compliant wireless networking technology. In these environments, such as at shipping ports and construction sites, wireless 802.11x networks could be established to provide coverage such that hoists would be in communication with a data repository for data transmission. Where neither cellular service nor 802.11x network capacity exists, periodic downloads of collected data could be accomplished by connecting hoist 16 with a data collection device, such as a USB drive, PDA or laptop, to download all data since the last download.

Regardless of the manner in which data is ultimately relayed from hoist 16 to central CPU 37, smart card 22 keeps track of what data has been transmitted and what data has not been transmitted and automatically knows where to resume each subsequent transmission or download. This may be accomplished by sequentially stamping each record with the date and time, by indexing or numbering each record of captured data with a sequence number and by keeping track of the last successfully transmitted sequence number for a given date.

Figure 3:
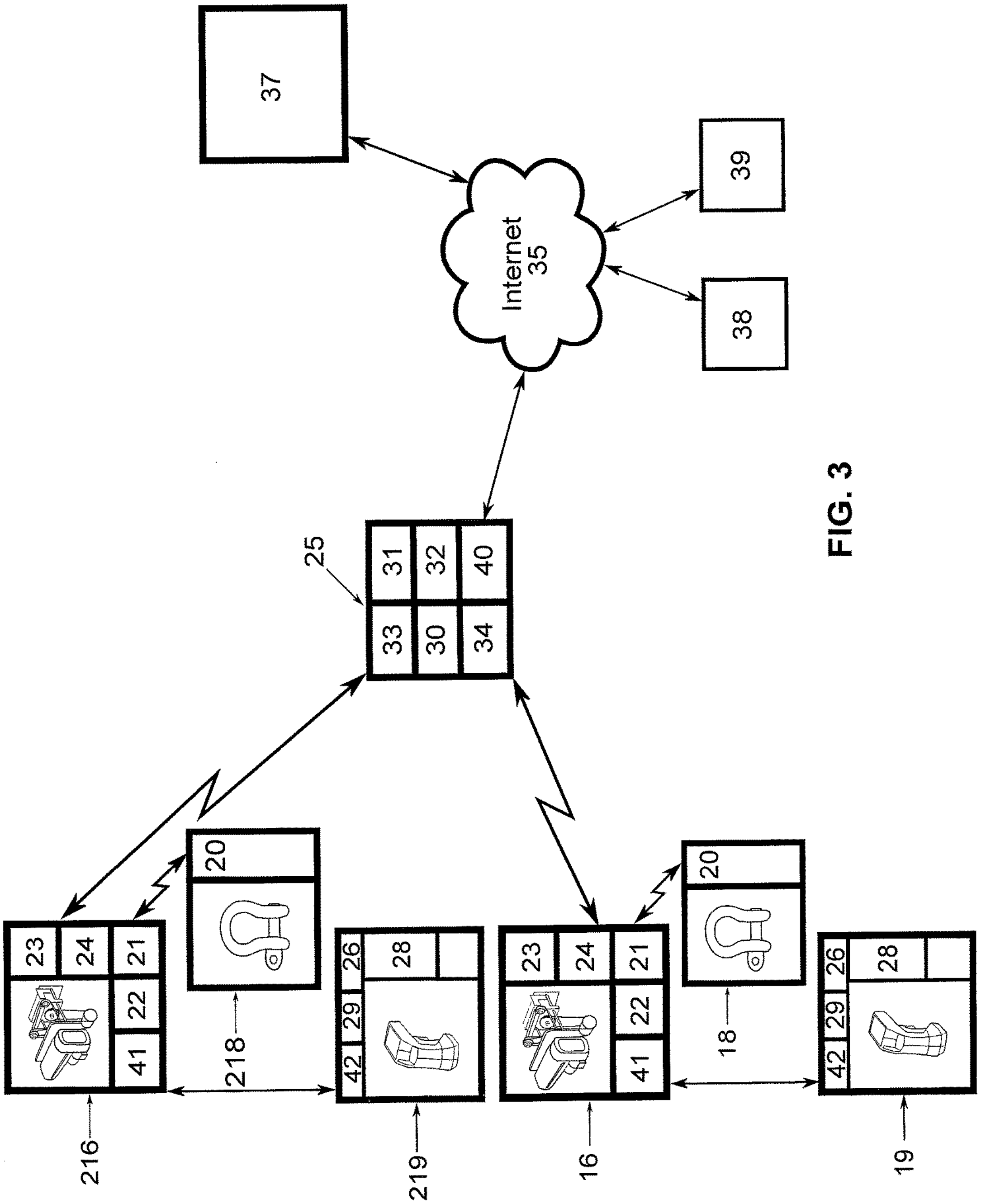
FIG. 3 is a schematic of an expanded embodiment of the improved material handling system shown in FIG. 1.

FIG. 3 shows the system with multiple hoists, all communicating with local PC 25. As shown, a second hoist 216, shackle 218 and pendant 219 are provided and such combination communicates with each other and local PC 25 in the same manner as hoist 16, shackle 18 and pendant 19. The data from hoist 16 and the data from hoist 216 are tagged with separate identification so that such data may be processed independently. In this way, data from multiple hoists can be collected and analyzed through a central processing platform.

Alternatively, the multiple hoist system shown in FIG. 3 may be configured such that hoists 16 and 216 communicate with server 37 through a cellular wireless interface 136, as described with reference to the embodiment shown in FIG. 2. Thus, rather than communicating with local PC 25, hoists 16 and 216, and pendants 19 and 219, may comprise cellular wireless interfaces 124 and 126, as described with references to the embodiment shown in FIG. 2, such that signals are sent via wireless cellular network 126 and internet 35 to server 37. Server 37 may then process the received data without any intermediate processing by local PC 25.

The present invention contemplates that many changes and modifications may be made. Therefore, while the presently-preferred form of the emissions measuring system has been shown and described, and several modifications and alternatives discussed, persons skilled in this art will readily appreciate that various additional changes and modifications may be made without departing from the spirit of the invention, as defined and differentiated by the following claims.

The invention claimed is:

1. A material handling system comprising:

a material lifting device;

said material lifting device having a sensor for sensing an operational parameter associated with said material lifting device;

a load attachment device configured and arranged to attach a load to said material lifting device;

said load attachment device having a data tag containing data regarding one or more parameters associated with said load attachment device;

a material handling control device configured and arranged to control operation of said material lifting device and to transmit a user id corresponding to the operator of the material handling control device;

a reader configured and arranged to read said data tag and to write parameter data to said data tag, the parameter data comprising at least one of a variable which is a function of the operation time of the load attachment device since its last maintenance, a record of any emergency or warning conditions during operation, and a record of the user id operating the system;

a processing unit communicating with said reader and said sensor;

said processing unit configured and arranged to receive data from said reader and said sensor; and wherein said processing unit is programmed to provide a warning output in real time as a function of said received data crossing a preset threshold value and to communicate said warning output to said material handling control device.

2. The system set forth in claim 1, wherein said material lifting device comprises a hoist.

3. The system set forth in claim 1, wherein said operational parameter associated with said material lifting device is selected from a group consisting of malfunction, load weight, overload, excessive jogging, starts beyond duty cycle, run time beyond duty cycle, and excessive heat.

4. The system set forth in claim 1, wherein said load attachment device comprises a below-the-hook lifting device.

5. The system set forth in claim 1, wherein said load attachment device is selected from a group consisting of a shackle, a vacuum lifting device, a magnet, a rigging hook, a sling, an eyebolt, a turnbuckle, a ring, a block, a chain, a clamp and a clip.

6. The system set forth in claim 1, wherein said data tag comprises an RFID tag and said reader comprises an RFID tag reader.

7. The system set forth in claim 6, wherein said RFID tag comprises an active RFID tag.

8. The system set forth in claim 1, wherein said data tag comprises a writable RFID tag.

9. The system set forth in claim 8, wherein said processing unit is configured and arranged to write to said RFID tag.

10. The system set forth in claim 1, wherein said parameter associated with said load attachment device is selected from a group consisting of rated capacity, load attachment device weight, identification number, inspection status, and size.

11. The system set forth in claim 1, wherein said reader is on said material lifting device or said reader is on said material handling control device.

12. The system set forth in claim 1, and further comprising a data processing platform configured and arranged to collect data via a wireless network from said processing unit.

13. The system set forth in claim 12, wherein said wireless network comprises a WiFi network or a cellular network.

14. The system set forth in claim 12, and further comprising a data processing center configured and arranged to collect data via the internet from said data processing platform.

15. The system set forth in claim 14, wherein said data processing center is configured to communicate with a remote user interface.

16. The system set forth in claim 15, wherein said remote user interface comprises a customer computer or a distributor computer and said communication is via the internet.

17. The system set forth in claim 15, wherein said user interface comprises a display screen and a keyboard.

18. The system set forth in claim 1, wherein said processing unit is connected to a wireless interface.

19. The system set forth in claim 18, and further comprising a data processing platform having a wireless interface configured to receive data transmitted from said processing unit.

20. The system set forth in claim 19, wherein said data processing platform comprises a data storage device configured to store data received from said processing center.

21. The system set forth in claim 20, wherein said data processing platform comprises a computer.

22. The system set forth in claim 21, wherein said data processing platform is connected to the internet.

23. The system set forth in claim 20, and further comprising a data processing center connected to the internet and configured and arranged to process data received from said data processing platform.

24. The system set forth in claim 23, wherein said data processing center is configured and arranged to provide a report of said processed data received from said data processing platform.

25. The system set forth in claim 24, wherein said report provides information on operating mode, predictive maintenance, operator training or safety with respect to said material lifting device.

26. The system set forth in claim 24, wherein said report is provided via a website.

27. A material handling system comprising:

a hoist;

a load attachment device configured and arranged to attach a load to said hoist;

a material handling control device configured and arranged to control operation of said hoist and to transmit a user id corresponding to the operator of the material handling control device;

a reader connected to said hoist and configured and arranged to read and to write parameter data to a data tag, the parameter data comprising at least one of a variable which is a function of the operation time of the load attachment device since its last maintenance, a record of any emergency or warning conditions during operation, and a record of which user id's were operating the system; and a processing unit communicating with said reader and configured and arranged to receive data from said reader; and, wherein said processing unit is programmed to provide a warning output in real time as a function of said received data crossing a preset threshold value and to communicate said warning output to said material handling control device.

28. A method of monitoring a material handling system comprising the steps of:

providing a material handling system comprising:

a material lifting device:

said material lifting device having a sensor for sensing an operational parameter associated with said material lifting device;

a load attachment device configured and arranged to attach a load to said material lifting device;

said load attachment device having a data tag containing data regarding one or more parameters associated with said load attachment device;

a material handling control device configured and arranged to control operation of said material handling device and to transmit a user id corresponding to the operator of the material handling control device;

a reader configured and arranged to read and to write parameter data to said data tag, the parameter data comprising at least one of a variable which is a function of the operation time of the load attachment device since its last maintenance, a record of any emergency or warning conditions during operation, and a record of which user id's were operating the system;

a processing unit communicating with said reader and said sensor;

said processing unit configured and arranged to receive data from said reader and said sensor;

reading said data tag of said load attachment device;

transmitting said data to a processing platform; and wherein said processing unit is programmed to provide a warning output in real time as a function of said received data crossing a preset threshold value and to communicate said warning output to said material handling control device.

29. A material handling system comprising:

an electric hoist;

said electric hoist having a sensor for sensing an operational parameter associated with said electric hoist;

a load attachment device configured and arranged to attach a load to said electric hoist;

said load attachment device having a data tag containing data regarding one or more parameters associated with said load attachment device;

a material handling control device configured and arranged to control operation of said electric hoist;

a reader configured and arranged to read said data tag and to write parameter data to said data tag;

a processing unit communicating with said reader and said sensor;

said processing unit configured and arranged to receive data from said reader and said sensor; and wherein said processing unit is programmed to provide a warning output in real time as a function of said received data crossing a preset threshold value and to communicate said warning output to said material handling control device.

30. The system set forth in claim 29, wherein said processing unit comprises a microprocessor.

31. The system set forth in claim 30, wherein said material handling control device comprises an operator control pendant.

32. The system set forth in claim 31, wherein said operator control pendant communicates wirelessly with said processing unit.

33. The system set forth in claim 30, wherein said operational parameter associated with said material lifting device comprises load weight, wherein said parameter associated with said load attachment device comprises rated weight capacity, and wherein said microprocessor is programmed to compare said load weight and said rated weight capacity.

34. The system set forth in claim 33, wherein said microprocessor output comprises a warning signal if said load weight exceeds said rated weight capacity.

* * * * *